United States Patent [19]

Spencer

[11] Patent Number: 5,240,295
[45] Date of Patent: Aug. 31, 1993

[54] KNOT TYING DEVICE

[76] Inventor: Donald R. Spencer, Rte. 1, Box 181, Grafton, Ill. 62037

[21] Appl. No.: 842,508

[22] Filed: Feb. 27, 1992

[51] Int. Cl.[5] .............................................. B65H 69/04
[52] U.S. Cl. ........................................ 289/1.5; 289/2; 289/17
[58] Field of Search ..................... 289/1.5, 2, 17, 18.1

[56] References Cited

U.S. PATENT DOCUMENTS

| | | | |
|---|---|---|---|
| 2,469,037 | 5/1949 | Harvey | 289/17 |
| 2,498,920 | 2/1950 | Holland | 289/17 |
| 2,773,713 | 12/1956 | Smalley | 289/17 |
| 3,606,405 | 9/1971 | Lally | 289/17 |
| 3,787,081 | 1/1974 | Macy | 289/17 |
| 3,877,737 | 4/1975 | Chappell | 289/17 |
| 4,400,025 | 8/1983 | Dennison | 289/17 |

Primary Examiner—Clifford D. Crowder
Assistant Examiner—Michael A. Neas
Attorney, Agent, or Firm—Polster, Lieder, Woodruff & Lucchesi

[57] ABSTRACT

A device which facilitates tying knots, particularly blood knots joining sections of a leader for a fishing line, includes a flexible frame having a base and left and right legs which project away from the base, there being a gap between the two legs. The frame carries a post which projects from the base into the gap intermediate the two legs and may be extended or retracted and even withdrawn. The legs carry winders which rotate about a common axis. Each winder has a hollow interior, a winding arm located at the gap, and a gripping sleeve remote from the gap. Lines or lengths of leader are inserted through the hollow interior of each winder and engaged with the winder arm of the other winder. When the winders are rotated, their arms twist the lines around each other, but the post forms a separation or opening in the wound region of the lines. The tag ends of the lines are inserted through the separation to produce a blood knot which is pulled tight. The device may also be used to produce a clinch knot for connecting a leader to a fly. The tying device may be mounted on a spool carrier which presents leader material or line of varying diameters for use in producing tapered leaders tailored precisely to one's needs.

21 Claims, 3 Drawing Sheets

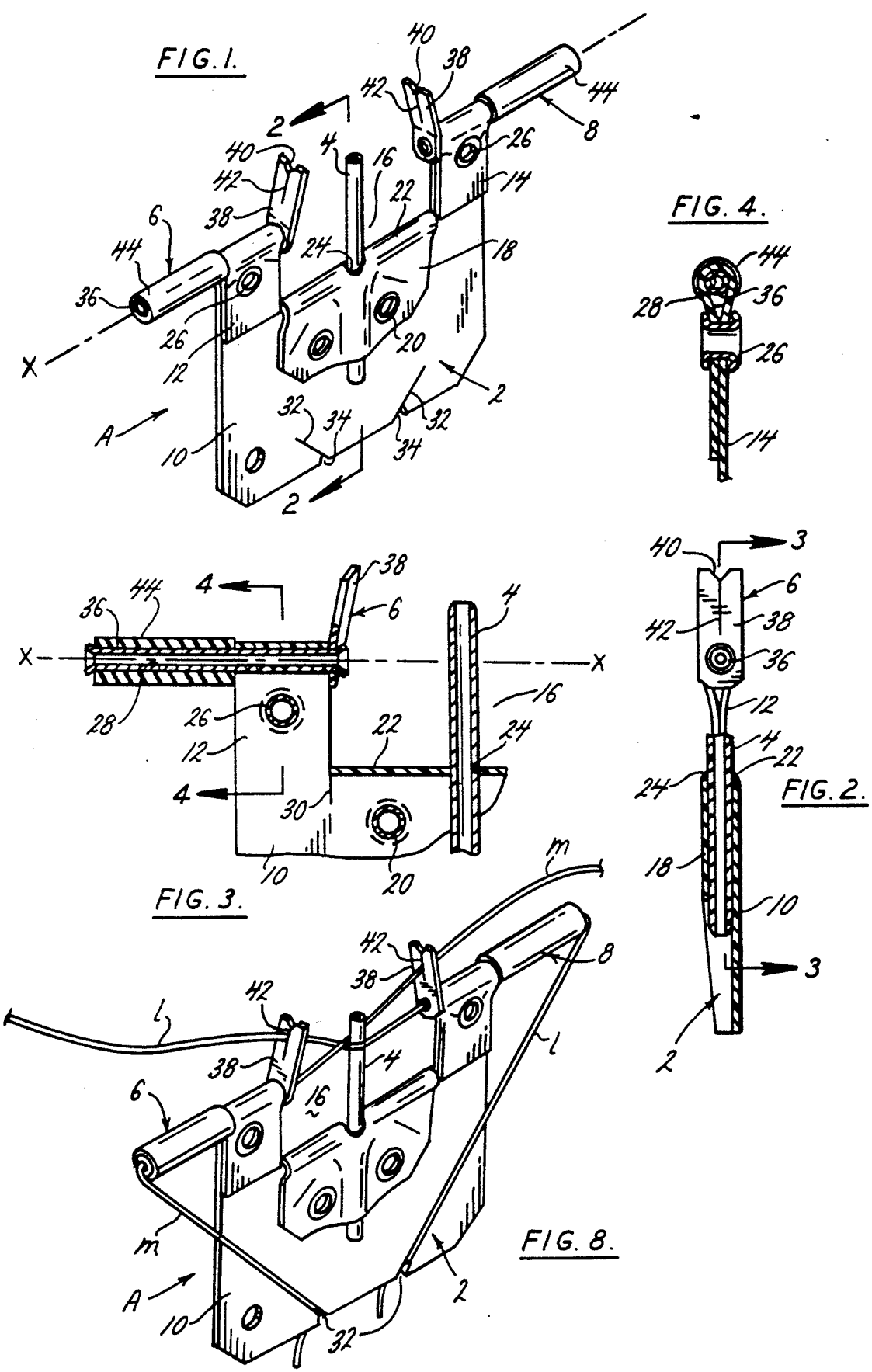

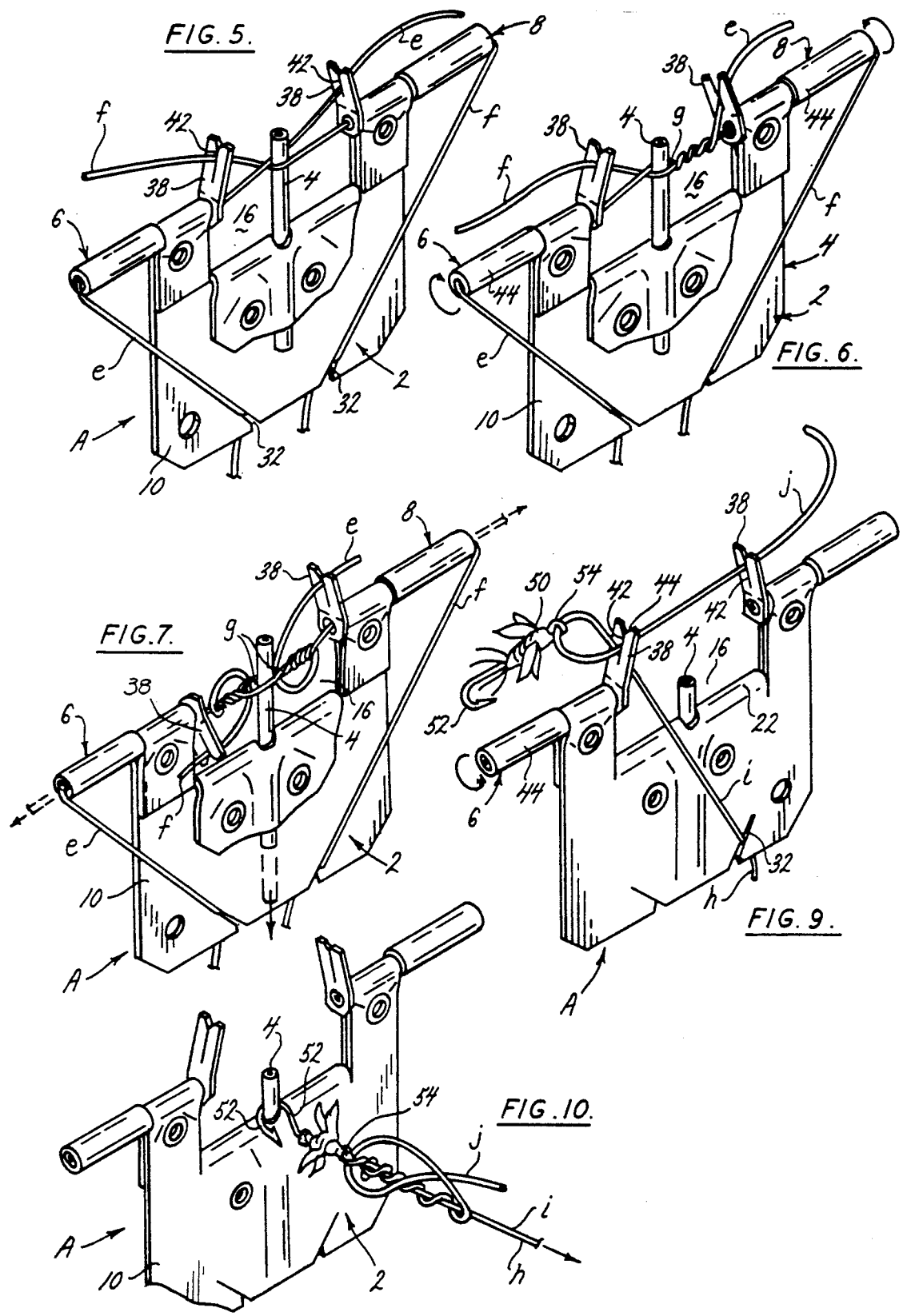

KNOT TYING DEVICE

BACKGROUND OF THE INVENTION

This invention relates in general to tying knots and more particularly to a device which facilitates tying knots in thin lines which are otherwise difficult to manipulate; and to a method for tying knots using the device.

Fly fishing demands a considerable amount of skill, not only in casting the fly-line, but also in selecting equipment for the varying conditions one encounters in that sport. Aside from the fly itself, perhaps the most important selection the fly fisherman must make is the leader which connects the fly to the fishing line. Normally, the leader is tapered, its large or butt end being attached to the fishing line and its smaller or terminal end to the fly. To an experienced fisherman, the length as well as the diameter of the leader throughout that length, depend on several variables, such as, the size and configuration of the fly, the size of fish the fisherman expects to catch, the wind over the waters, the turbulence of the waters, the clarity of the waters, and the velocity and direction of the current in the waters.

Typically, a leader will range from as short as 6 or 7 feet to as long as 12 to 15 feet. Some leaders possess a true taper, that is, they undergo a gradual change in diameter from the butt end to the terminal end without any interruptions in the leader material. Other leaders consist of lengths of varying diameter leader material tied together. Many fishermen favor the latter, that is the knotted leader, in that it enables them to tailor the leader to their own needs. But irrespective of whether the fisherman uses a truly tapered leader or a knotted leader, the fisherman will usually find it necessary to replace the end section or segment of the leader, often called the tippet, for this is where the leader is thinnest and weakest, and where it will break if its capacity is exceeded. A knot in the leader will repair the break. Aside from that, when a fisherman changes to a smaller fly, a thinner tippet is often required—a tippet which is attached to the remainder of the leader with a knot. Hence, the typical fisherman must tie knots from time to time in leader material, which is usually monofilament line.

The knots which join the lengths of leader material must of course accommodate the varying diameters of leader material, yet must be small so as to not only minimize the shadow cast by the leader when on water, but to further pass through the guides on a fishing rod without snagging. It goes without saying that the knot must be strong. The true blood knot meets these requirements, but blood knots are difficult to tie, at least in thin monofilament leader material, and indeed to tie such knots one must possess good eyesight and considerable manual dexterity. Devices exist for aiding one in tying so-called blood knots—knots which are not true blood knots in that the lines which are joined are twisted together in a manner which allows the twists so formed to unravel when unrestrained. A true blood knot, on the other hand, has the lines wrapped each one around the other, and resists unravelling. A true blood knot exerts a lateral force on the ends of the lines which are joined, rather than a squeezing action true in some similated blood knots, and the result is a stronger knot.

Just as the length of leader material must be tied securely together without undue enlargement of the leader, the leader must be connected to the hook of the fishing fly without detracting from the appeal of the fly to fish. Again, the knot must be small and yet secure. Fishermen traditionally use the clinch knot for this purpose, and while a clinch knot is easier to tie than a blood knot, it still requires considerable dexterity. Other knots present similar problems.

The present invention facilitates tying genuine blood knots and other knots, such as barrel knots and clinch knots. It possesses only a few parts, namely a frame, a post which projects into a gap in the frame, and winders which turn on the frame on each side of the gap. As such it is inexpensive to manufacture and simple to operate.

DESCRIPTION OF THE DRAWINGS

In the accompanying drawings which form part of the specification and wherein like numerals and letters refer to like parts wherever they occur:

FIG. 1 is a perspective view of a knot tying device constructed in accordance with and embodying the present invention;

FIG. 2 is a sectional view of the knot tying device taken along line 2—2 of FIG. 1;

FIG. 3 is a sectional view taken along line 3—3 of FIG. 2;

FIG. 4 is a sectional view taken along line 4—4 of FIG. 3;

FIG. 5 is a perspective view showing the knot tying device threaded with line to form a blood knot;

FIG. 6 is a perspective view showing one of the lines wound around the other line during the formation of a blood knot;

FIG. 7 is a perspective view showing the tag ends of the lines passed through the gap in the wound portions of the lines to form a loose blood knot;

FIG. 8 is a perspective view of the knot tying device threaded for tying a knot to join extended lengths of line taken from different spools;

FIG. 9 is a perspective view of the knot tying device threaded for the formation of a clinch knot to secure a fly to a line;

FIG. 10 is a perspective view showing the formation of a loose clinch knot;

DETAILED DESCRIPTION

Figure 11:
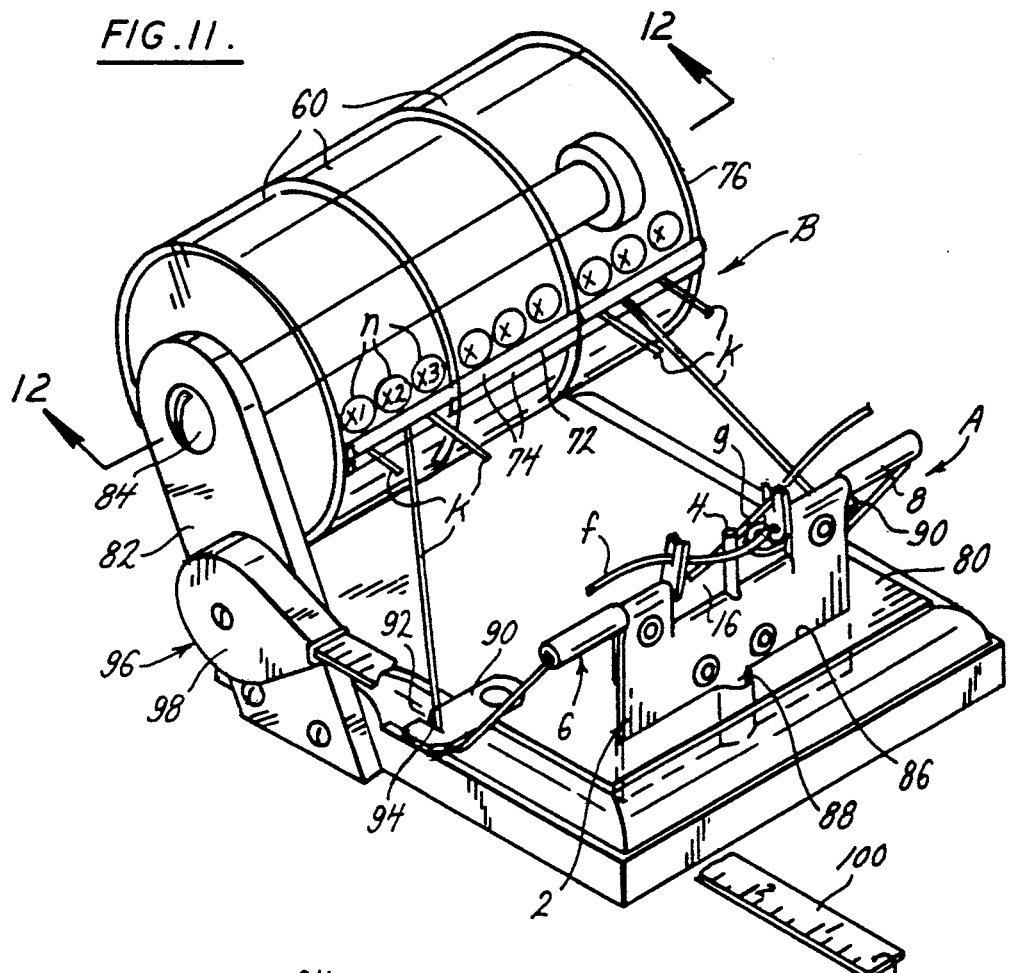
FIG. 11 is a perspective view of the knot tying device and a spool carrier for supplying lines to the device with the device being threaded for tying a blood knot.

Referring to the drawings, a knot tying device A (FIG. 1) is suitable for tying knots in thin monofilament line of the type used for leaders at the ends of fishing lines. The device A is particularly suited for tying genuine blood knots between sections of leader material. It is also suited for tying clinch knots to join leaders to fly hooks. The tying device A includes a flexible frame 2, a dividing post 4 located on the frame 2 midway between its sides, and a pair of winders 6 and 8 mounted on the frame 2 at its sides so that the post 4 lies between the two winders 6 and 8.

The frame 2 is preferably formed from a sheet material having enough rigidity to retain its shape, yet a measure of flexibility. A polyethylene material of the type used for notebook covers and having a thickness of about 0.03 inches is suitable for this purpose. The frame 2 originates as a generally rectangular shape, which is blanked or otherwise cut from a larger sheet of the material and then folded into a somewhat U-shaped configuration, so that it has (FIG. 1) a relatively high base 10 and two legs 12 and 14 rising from the base 10. Between the two legs 12 and 14 exists a tying gap 16, and this gap derives from a center flap 18 having been folded out of it and over onto the base 10 to which it is attached with a pair of rivets 20, there being one on each side of centerline of the flap 18. The flap 18 is joined to the base 10 along a fold 22 which at the centerline of the gap 16 contains an aperture 24 that is about as large as the diameter of the dividing post 4. Indeed, the post 4 fits through the aperture 24 and is captured between the flap 18 and the base 10 of the frame 2 (FIGS. 1 and 2). At each leg 12 and 14 the sheet material of frame 2 is folded over upon itself and secured with a rivet 26 (FIG. 4), so that the legs 12 and 14, owing to the double thickness of sheet material, possesses greater rigidity at their ends. The folds in the legs 12 and 14 also form tubular channels 28 which accommodate the winders 6 and 8 and indeed create sleeve-type bearings for the winders 6 and 8, so that the winders 6 and 8 rotate about a common axis X of rotation passing through the ends of the legs 12 and 14. The legs 12 and 14 are separated from the fold 22 in the base 10 by slits 30 (FIG. 3) which extend the legs 12 and 14 below the fold 22 and impart to the legs 12 and 14 greater flexibility than they would otherwise possess. The slits 30 also cause the fold 22 to assume a more centered position with respect to the base 10 and flap 18.

The lower edge of the base 10 lies parallel to the fold 22, and here the base 10 has two cuts or slits 32 (FIG. 1). The slits 32 lie generally beneath the slits 30 and hence are offset from the post 4. The slits 32 extend obliquely away from the lower margin and toward the outer ends of the winder arms 36. They originate at notches 34 in the lower margin.

The dividing post 4 (FIGS. 1-3) is simply a tube which is considerably longer than the flap 18 is high and is about the same diameter as the aperture 24 in the fold 22 between the flap 18 and the base 10. The rivets 20 which secure the flap 18 to the base 10 are set close enough together to snugly capture the post 4 between the flap 18 and the base 10. While the post 4 will move under a relatively light manually-exerted force, it will retain its position unless displaced. Normally, the post 4 projects completely through the gap 16 in the frame 2, bisecting that gap 16, and indeed is long enough to project beyond the gap 16, that is beyond the common axis X of rotation for the winders 6 and 8. The post 4 may be round or square in cross-section.

Each winder 6 and 8 includes a metal tube 36 of circular cross-section (FIGS. 1-4) which extends through and is captured in the channel 28 for the leg 12 or 14 on which it is mounted, but the tube 36 is considerably longer than the leg 12 or 14 through which it extends. One end of the tube 36 lies at the inner margin of that leg 12 or 14 and thus barely projects into the gap 16. Here the leg 12 or 14 is fitted with a winding arm 38 that is short enough to pass completely through the gap 16, that is over the fold 22, when the winder 6 or 8 of which it is a part is turned. In this regard, the tab 38, which is likewise formed from a flexible material, such as polyethylene, fits tightly over the end of the tube 38, so that it does not rotate easily on the tube 36, but instead rotates with the tube 36. Beyond the arm 38, the inner end of the tube 36 flares outwardly to retain the arm 38 on the tube 36. The arm 38 projects radially from the inner end of the tube 36 and at its free end is provided with a notch 40 which opens away from the axis X of the tube 36 and a slit 42 which extends radially inwardly from the notch 40. The tube 36, being longer than the leg 12 or 14 is wide, projects beyond the outer margin of the leg 12 or 14. Here it is fitted with a turning sleeve 44 that extends from the outer margin of the leg 12 or 14 to the outer end of the tube 36 which is likewise flared to facilitate entry of monofilament line and to retain the sleeve 44 on the tube 36. The sleeve 44 fits tightly over the tube 36 and is preferably formed from a soft material having a relatively high coefficient of friction as to the tube 36, so that it will not rotate on the tube 36. Instead, when the sleeve 44 is turned, the tube 36 rotates within the leg 12 or 14 through which it extends, and the arm 38 rotates in the region of the gap 16. The sleeve 44 provides a gripping surface for the winder 6 or 8 of which it is a part and prevents the winder 6 or 8 from shifting axially in its leg 12 or 14.

The slits 32 in base 10 of the frame 2 and the slits 42 in the arms 38 of the winders 6 and 8 are simple cuts in the material from which frame 2 and arm 38 are made. Since that material is flexible and slightly elastic, it will yield to accommodate a monofilament line—the type of line from which leaders are formed. Indeed, the notches 34 and 40 facilitate the entry of such line into the slits 32 and 42. Once a line is in one of the slits 32 or 42, the flexible material grips and retains it. Of course, a slight tug will remove the line from the slit 32 or 42.

The knot tying device A enables one to tie a blood knot between two lengths of leader material which are actually two short lines e and f (FIGS. 5-7). To prepare the tying device A for a blood knot, one simply extends the dividing post 4 through the gap 16 between the legs 12 and 14 until the end of the post 4 is about ½ inch beyond the common axis X of rotation for the two winders 6 and 8 (FIG. 5). The user also turns the winders 6 and 8 at their sleeves 44 until their winding arms 38 project upwardly away from the fold 22 at the bottom of the gap 16. The user then inserts the line e into the left slit 32 in the base 10, leaving several inches extended beyond the slit 32 (FIG. 5). Actually, the user inserts the line e into the notch 34 at that slit 32 and then works the line e into the slit 32 so that the flexible material of the base 10 grips and holds the line e on the base 10. Next the user inserts the tag end of the line e into the outer end of the tube 36 for the left winder 6 and advances that end through the tube 36 and into gap 16. The user thereupon grasps the tag end and pulls the line e until it becomes reasonably taut. The user then lays the portion of the length e that emerges from the tube 36 to one side of the post 4 and into the notch 40 on the upstanding arm 38 for the right winder 8, forcing the line e into the slit 42 of the arm 38, so that the arm 38 retains it.

Thereafter the user repeats essentially the same procedure with the line f, but uses the right slit 32, right tube 36 and left winding arm 38 which are not occupied by line e (FIG. 5). Thus, the line f when initially fitted to the tying device A is gripped in the right slit 32 beneath the right leg 14 and from that slit extends through the tube 36 of the right winder 8, through the gap 16 to the arm 38 of the left winder 6, where it is retained in the slit 42 of that arm. However, within the gap 16 the line f lies along the opposite side of the post 4, so that the post 4 separates the two lengths e and f within the gap 16.

Once the two lines e and f of leader material are installed on the frame 2 and fitted to the winders 6 and 8, the user rotates the two winders 6 and 8 in opposite directions, each for several revolutions (FIG. 6). In this regard, the winders 6 and 8 are easily gripped and turned at their sleeves 44. The rotation of the winder 6 causes its arm 38 to wind the line e around the line f within the gap 16 of the frame 2, and likewise the rotation of the winder 8 causes its arm 38 to wind the line f around the line e. The number of turns, to a measure, depends on the thickness of the lines e and f, finer monofilaments requiring a greater number of turns than thicker ones. The rotation wraps or winds the lines e and f together within the gap 16, but the post 4 serves to spread the lines e and f at the center of the wound region so as to maintain an opening g in that region (FIG. 7).

To complete the knot, the end of the line e is withdrawn from the arm 38 of the winder 8 and inserted in one direction through the opening g between the wound regions of the lines e and f, and then again inserted into the slit 42 of the arm 38 from which it was withdrawn (FIG. 7). Similarly, the line f is withdrawn from the arm 38 of the winder 6 and inserted in the opposite direction through the opening g between the wound regions, whereupon it is brought back to the arm 38 of the winder 8 and inserted into the slit 42 of that arm. Thereupon the user withdraws the post 4 from the opening g between the twisted regions, this being achieved simply by retracting it further into the space between the center flap 18 and base 10 of the flexible frame 2. With the post 4 withdrawn, the user pulls on the two lines e and f where they emerge from the tubes 36 of the winders 6 and 8, and this draws the knot tight. Finally, the user cuts the tag ends off about 1/32 inch beyond the knot, and withdraws the knotted lines e and f from the tubes 36 of the winders 6 and 8.

One may tie a barrel knot with the knot tying device A, using essentially the same procedure. However, the tag ends of the lines e and f are inserted through the opening g between the wound regions in the same direction, not opposite directions.

To join two continuous lines from two different spools, the user withdraws the lines from the spools until suitable lengths 1 and m lie beyond the spools (FIG. 8). The length 1 at its tag end is brought over the arm 38 for the left winder 6 and inserted into the inner end of the tube 36 for the right winder 8. Indeed, the tag end is passed all the way through that tube 36 and pulled far enough beyond to bring it to the right slit 32 in the lower margin of the base 10. Here the length 1 close to its tag end is brought into the notch 34 and manipulated into the slit 32 leading away from that notch 34. Thus, the slit 32 on the right side of the base 10 holds and restrains the tag end of the length 1. Once the tag end is secured, the portion of the length 1 that is at the arm 38 for the left winder 6 is manipulated through the notch 40 in the arm 38 and into the slit 42 that leads radially inwardly from the notch 40. Thus, the arm 38 holds and stabilizes this intermediate portion of the length 1. Between the arm 38 of the left winder 6 and the tube 36 of the right winder 8 the length 1 passes through the gap 16 along one side of the post 4 which is in its extended position.

The other length m is brought over the arm 38 on the right winder 8 and inserted through the tube 36 of the left winder 6, whereupon its tag end is fitted to the left slit 32 along the lower edge of the base 10 (FIG. 9). The portion of the length m that is along the arm 38 of the right winder 8 is thereupon engaged with the slit 42 in that arm 38. The portion of the length m that lies within the gap 16 passes along the opposite side of the post A.

With the lengths 1 and m so arranged on the tying device A, the user withdraws the dividing post 4 from the base 10 and rotates it within the gap 16. This causes the length 1 to twist around the length m and likewise the length m to twist around the length 1 all within the gap 16, but the post 4 separates the lengths 1 and m within the middle of the gap 16, forming an opening g between the two twisted regions. The post 4 is reinserted into aperture 24 where it is retained. The tag ends of the lengths 1 and m are then detached from the slits 32 in the base 10, withdrawn from the tubes 36 of the winders 6 and 8 and inserted from opposite directions through the opening g between the twisted regions of the lengths 1 and m. This produces a simulated, yet loose, blood knot. The knot is tightened by completely withdrawing the post 4 from the twisted region and then pulling the spool ends of the lengths 1 and m, that is the regions between the knot and the spools C.

The tying device A also aids in tying a clinch knot in a tippet h for attaching fishing fly 50 to the end of the tippet h (FIGS. 9 and 10). Being the last length or section of a leader, the tippet h must be fastened securely to a hook 52 that forms part of the fly 50. Actually the hook 52 has an eye 54 at its end, and the tippet h passes through the eye 54, the clinch knot being formed at the eye 54.

To configure the tying device A for a clinch knot, the winders 6 and 8 are again turned until the tabs 36 on them project away from the gap 16 and the fold 22 at its bottom, but the post 4 is retracted somewhat so that only about ¼ inch of it projects beyond the fold 22. The tippet h, several inches from its tag end, is inserted through the eye 54 of the hook 52 where a loop is formed (FIG. 9). Beyond the loop will lie a long length i of tippet or line and a short length j, the latter of course leading out to the tag end. The long length i, which should lie behind the short length j, is inserted into the slit 42 for the winding arm 38 of the left winder 6 and thence brought across the base 10 and inserted into the slit 32 that lies below the right leg 14. The short length j is brought over the long length i in the region of the arm 38 for the left winder 6 and then on to the arm 38 of the right winder 8, it being inserted into the slit 42 in that arm 38. Thereupon the left winder 6 is turned several times, and with each turn, the fly 50 passes through the gap 16 and over the fold 22 at the bottom of the gap 16. This winds the short length i around the long length j while retaining the loop.

Thereupon, with the loop and winding intact, the long length i is retained in the right slit 32 in the base 10, while the short length j is removed from the slit 42 in the right arm 38, and its tag end is inserted through the winding at the eye 54 of the hook 52 and thence through the loop, thus creating a loose clinch knot (FIG. 10). The loose knot 42 is then removed from the slit 42 in the left winder arm 38 and the hook 52 is engaged with the post 4 in the gap 16 of the frame 2 which reduces the chance of pulling the point of the hook into one's finger when the knot is drawn tight by one simply pulling the long length i. Finally, the short length j is cut off about 1/16 inch from the knot.

Figure 12:
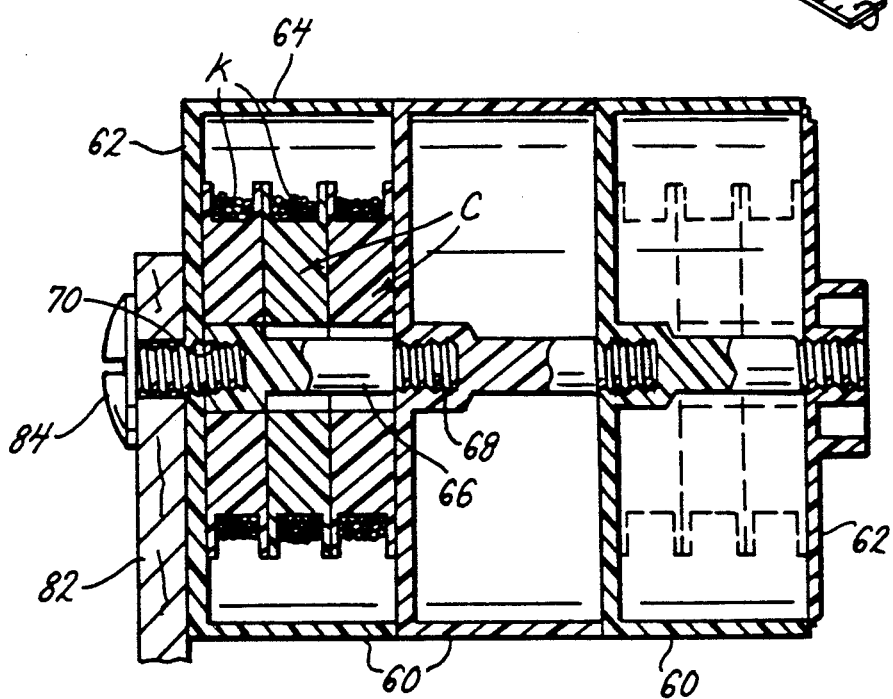
FIG. 12 is a sectional view taken along line 11—11 of FIG. 10.

The knot tying device A may be installed on a spool carrier B (FIG. 11) which holds several spools C (FIG. 12) of leader material or line k, each line k preferably differing in diameter from the next. Actually the spool carrier B supports several housings 60, and each housing 60 in turn holds several spools C, presenting the line k from those spools C, so that they can easily be withdrawn under slight tension. Each diameter is designated by a number n attached to peripheral wall 64.

Each housing 60 has an end wall 62 (FIG. 11) and a cylindrical peripheral wall 64 formed integral with the end wall 62. In addition, it has a spindle 66 which extends from the end wall 62 through the interior of the cavity encircled by the peripheral wall 64 and slightly beyond where it has threads 68. The spindle 66 holds the spools C which fit over them. The end wall 62 contains a threaded socket 70 which actually extends into the base of the spindle 66, its threads matching the threads 68 at the free end of the spindle 66. The peripheral wall 64 has an axially directed slot 72 fitted with elastomeric liners 74. The lines k on the several spools C that are within the housing 60 pass through the slot 72 where they are gripped tightly and stabilized by the liners 74. While the liners 74 grip the lines e, they do not prevent the lines k from being withdrawn through the slot 72.

The threads 68 on the end of the spindle 66 for the housing 60 and the threaded socket 70 in the end wall 62 enable several housings 60 to be joined together end-to-end. In this regard, the threads 68 on the end of the spindle 66 for one housing 60 are simply engaged with the threaded socket 70 in the end wall 62 of another housing 60. The one housing 60 is turned relative to the other until the end wall 62 on the one housing 60 comes against the end edge of the peripheral wall 62 on the other. With the two housings 60 so joined, the cylindrical cavity in the one housing 60 is completely enclosed, and this serves to retain spools C in that housing. The endmost housing 60 is enclosed with an end plate 76 having a threaded socket 78 at its center. The threads in the socket 78 engage the threads on the spindle 66 of the endmost housing 60, enabling the end plate 76 to be turned down over the spindle 66 and brought against the end edge of the peripheral wall 64 for the endmost housing 60.

The housings 60 and their capacity to be joined end to end are described and illustrated in U.S. Pat. No. 4,998,685 granted to D. Spencer on Mar. 12, 1991.

In addition to the housings 60 connected together end-to-end, the spool carrier B includes a base 80 (FIG. 10) having a bracket 82 extended upwardly from one of its sides. Near its upper end the bracket 82 is fitted with a screw 84, the threads of which match the threads 68 on the threaded spindles 66 of the housings 60. The screw 84 threads into the socket 70 in the exposed end wall 62 of the endmost housing 60, bringing that endwall 62 snugly against the bracket 82. This positions the several housings 60 generally over the base 80. Most of the base 80 resides beyond the end-to-end housings 60, and here it is provided with a slot 86 that lies parallel to the common axis of the screw 84 and housings 60. Midway between its ends, the slot 86 is enlarged with a hole 88. The slot 86 is only slightly wider than the material from which the flexible frame 2 is cut, whereas the hole 88 is large enough to accommodate that material and in addition the post 4.

The base 10 of the frame 2 fits into the slot 86 of the base 80 for the spool carrier B, with the enlarged thickness formed by the post 4 being accommodated at the hole 88. But the slot 86 is only wide enough to receive the portion of the base 10 that lies below the center flap 18. Indeed, the flap 18 serves as a stop, and thus locates the frame 2 vertically in the slot 86. The post 4, being somewhat confined in the hole 88, serves to rigidify the portion of the frame 2 that projects out of the slot 86.

The carrier base 80 along each of its side edges is provided with tabs 90 (FIG. 11) which project laterally beyond the edges. The tabs 90, which are formed from the same flexible material as the frame 2, have notches 92 and slits 94 extending inwardly from the notches.

Finally, on its bracket 82 the spool carrier B is fitted with a tape measure 96 including a housing 98 and a short tape 100, perhaps no longer than 2 feet, which withdraws from the housing 98 under a spring bias.

The knot-tying device A when fitted to the slot 86 in the base 80 of the spool carrier B lies in front of the several spools C in the housings 60 on that carrier and the tying device A and carrier B provide a very convenient applicance for tying blood knots and other knots as well (FIG. 10). Indeed, the housings 60 present a variety of lines k varying in diameter so that the user can select precisely the diameter of line k that best suits his needs for a leader. To tie a blood knot with the device A, the lines k are threaded through the device the same as if it were independent of the carrier base 80, except that the spool ends of the lines k are secured in the slits 94 of the tabs 90 instead of in the slits 32 of the base 10. One can use the tape 100 to measure the leader material k withdrawn from anyone of the spools C.

The tying post 4 may be withdrawn completely from the base 10 of the frame 2. When removed, the post 4 is useful in tying other knots, such as the Albright knot, the Grip knot, the Tube knot and the Nail knot.

This invention is intended to cover all changes and modifications of the example of the invention herein chosen for purposes of the disclosure which do not constitute departures from the spirit and scope of the invention.

What is claimed is:

1. A device for tying a knot in a line, said device comprising: a frame having a base and first and second legs projecting from the base, there being a gap between the legs; a separating element mounted on the frame and projecting into the gap where it is spaced from the two legs; and first and second winders mounted on the first and second legs respectively, each winder being hollow with its hollow interior opening generally toward the gap so that a line can be extended through the winder into the gap, each winder being capable of rotating on the leg on which it is mounted, each winder having a winding element located in the gap, the winding element projecting generally radially with respect to the axis of rotation for the winder and being configured to grip and hold the line.

2. A device according to claim 1 wherein each winder completely encircles its hollow interior.

3. A device according to claim 2 wherein the separating element is located generally midway between the legs and lies generally parallel to the legs.

4. A device according to claim 2 wherein the separating element may be shifted relative to the base to extend further from or retract further into the base and may be detached from the base.

5. A device according to claim 1 wherein the first and second winders rotate about a common axis.

6. A device according to claim 1 wherein the winding elements pass into the gap as the winding elements rotate about their axes of rotation.

7. A device according to claim 6 wherein the winding elements project beyond the legs so that they can be manually gripped and turned.

8. A device according to claim 1 wherein each winder includes a tube which extends through the leg on which it is mounted and is capable of rotating in that leg, the tube having one end at the gap and the winding element being mounted on that end of the tube, the tube being longer than the leg is wide so that a portion of it may be turned manually beyond the leg.

9. A device according to claim 8 wherein each winder also includes a sleeve fitted around the portion of the tube that projects beyond the leg through which the tube extends for enabling one to easily grip and rotate the winder 10. A device according to claim 6 wherein the frame is configured to grip and hold the line.

11. A device according to claim 8 wherein the frame is formed from a flexible sheet material and the flexible material at the ends of the legs is folded over onto itself and captures the winding elements such that they cannot be displaced radially.

12. A device according to claim 2 wherein the frame is formed from a flexible sheet material and the sheet material is folded over onto itself between the two legs at the base to provide a fold that extends along the gap and a flap which lies along and is attached to the base: and wherein the separating element is captured between the base and the flap and projects through the fold.

13. A device according to claim 12 wherein the separating element is a post.

14. The combination of a tying device for tying a knot in a line and a spool carrier for holding the tying device, said tying device comprising: a frame having a base and first and second legs projecting from the base, there being a gap between the legs; a separating element mounted on the frame and projecting into the gap where it is spaced from the two legs; and first and second winders mounted on the first and second legs respectively, each winder being hollow with its hollow interior opening generally toward the gap so that a line can be extended through the winder into the gap, each winder being capable of rotating on the leg on which it is mounted, each winder having a winding element located in the gap, the winding element projecting generally radially with respect to the axis of rotation for the winder and being configured to grip and hold the line; said spool carrier comprising: a base to which the frame of the tying device is fitted such that the legs of the tying device are presented away from the base, a bracket on the base, the bracket being capable of holding a plurality of spools of line so that a line can be withdrawn from any of the spools and connected by a knot at the tying device with a line withdrawn from another of the spools or with a fish hook.

15. The combination according to claim 14 wherein the spool carrier supports housings in which the spools are contained, and each housing has a slot through which line from the spools contained within it is withdrawn, the housings further having liners along the slots to grip the line and retain it.

16. The combination according to claim 15 wherein the housings are generally cylindrical, each having a peripheral wall, an end wall at one end of the peripheral wall, a spindle extending from the end wall through the region surrounded by the peripheral wall and terminating at threads, and a threaded socket opening out of the end wall, the threads of the socket matching the threads on the spindle, the housings being joined end to end with the spindle of one being threaded into the socket of the next.

17. A device for tying a knot between two lines or in a single line, said device comprising: a frame having a base and left and right legs projection from the base such that a gap exists between the two legs; a post projecting from the base into the gap intermediate the legs; and a left winder mounted on the left leg for rotation about an axis and a right winder mounted on the right leg for rotation about substantially the same axis as that of the left winder, each winder being hollow along the axis of rotation, with its hollow interior at its inner end opening into the gap and at its outer end opening away from the frame, each winder having a winding element fitted to its inner end, with the element projecting away from the axis of rotation and at its outer end being configured to grip a line, the winding element passing through the gap as the winder revolves, each winder also having a gripping surface located between its outer end and the frame leg on which it is mounted to facilitate manual rotation of the winder.

18. A tying device according to claim 17 wherein the post is extendable and retractable on the base so that the distance it projects into the gap may be varied.

19. A tying device according to claim 17 wherein the base of the frame is configured to grip the line.

20. A method of joining first and second lines, said method comprising: inserting the first line through the hollow interior of a left winder that is capable of rotating on a left leg which projects from a base; inserting the second line through the hollow interior of a right winder that is capable of rotating about substantially the same axis on a right leg which also projects from the base, but is spaced from the first leg so that a gap exists between the two legs; extending the first line from the first winder past one side of a post which projects from the base into the gap between the two legs and engaging the first line with the end of a winding element on the second winder where the winding element projects away from the axis and moves through the gap when the second winder rotates; extending the second line past the other side of the post and engaging it with the end of a winding element on the first winder, where the winding element projects away from the axis and moves through the gap when the first winder rotates; rotating the winders and their winding elements in opposite directions so that the first line wraps around the second line between the post and the second winder and the second line wraps around the first line between the post and the first winder to create an opening between the wound lines at the post; and thereafter inserting the ends of the first and second lines through the opening between the lines at the post.

21. The method according to claim 20 wherein the ends of the lines are inserted in opposite directions through the opening between the lines at the post.

* * * * *